(No Model.) 3 Sheets—Sheet 1.

A. L. IDE.
POWER TRANSMISSION.

No. 500,579. Patented July 4, 1893.

Witnesses,
S. Mann,
F. C. Goodwin.

Inventor,
Albert L. Ide
By Offield, Towle & Linthicum
Attys.

(No Model.) 3 Sheets—Sheet 2.

A. L. IDE.
POWER TRANSMISSION.

No. 500,579. Patented July 4, 1893.

Witnesses,

Inventor,
Albert L. Ide
By Offield, Towle & Linthicum
Attys.

(No Model.) 3 Sheets—Sheet 3.
A. L. IDE.
POWER TRANSMISSION.
No. 500,579. Patented July 4, 1893.
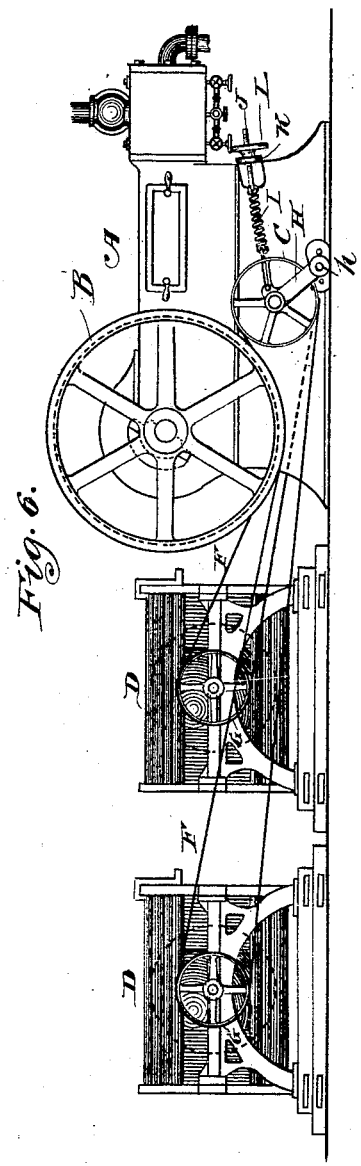
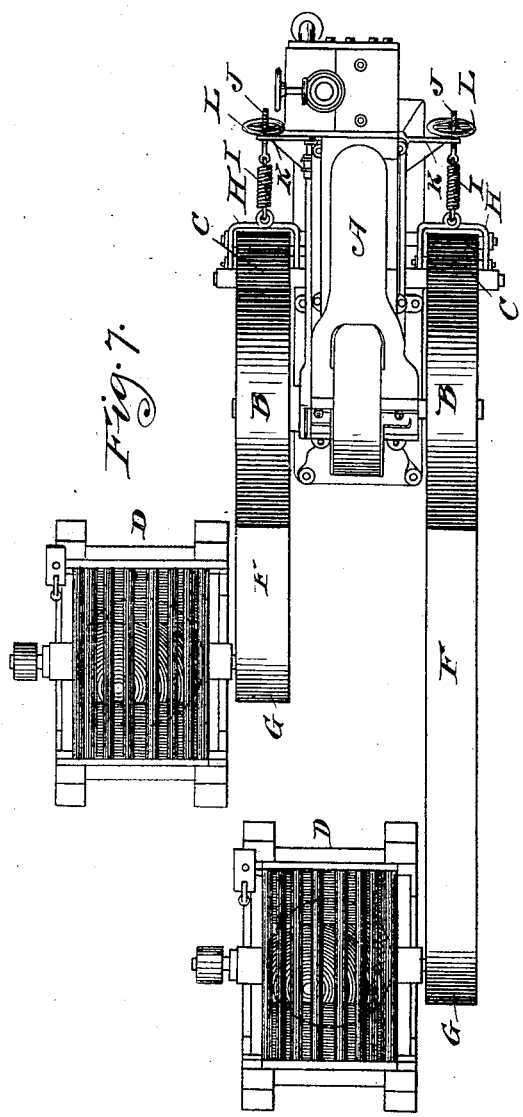
Witnesses
F. F. Mann
F. C. Goodwin
Inventor:
Albert L. Ide
By Offield, Towle & Linthicum
Att'ys.

UNITED STATES PATENT OFFICE.

ALBERT L. IDE, OF SPRINGFIELD, ILLINOIS.

POWER TRANSMISSION.

SPECIFICATION forming part of Letters Patent No. 500,579, dated July 4, 1893.

Application filed July 19, 1892. Serial No. 440,481. (No model.)

*To all whom it may concern:*

Be it known that I, ALBERT L. IDE, of Springfield, Illinois, have invented certain new and useful Improvements in Power Transmission, of which the following is a specification.

The object of this invention is to provide improved means for transmitting power from an engine or a line shaft to a machine driven thereby, and the invention is particularly applicable to the driving of dynamos and other machines where from lack of space a compact arrangement of the power and machinery is desired.

One object of the invitation is, therefore, to arrange the parts so that the driven pulley is located near the driver, due regard being had to such an arrangement as will secure a large contact surface of the belt on the driven pulley.

To this end one feature of my invention consists in mounting an idler pulley upon the engine base around which idler the driving belt is carried, said belt also passing over the driven pulley and a strand thereof running in contact with the surface of the driving pulley of the engine whereby the belt is driven by friction between it and the driver. The location of the idler with reference to the driver and the driven pulley is such that the belt passes around more than half of the surface of the driven pulley and has also a frictional contact with the rim of the driving pulley through an arc of such length as will give it a frictional contact adequate to the driving of the belt.

Figure 1:
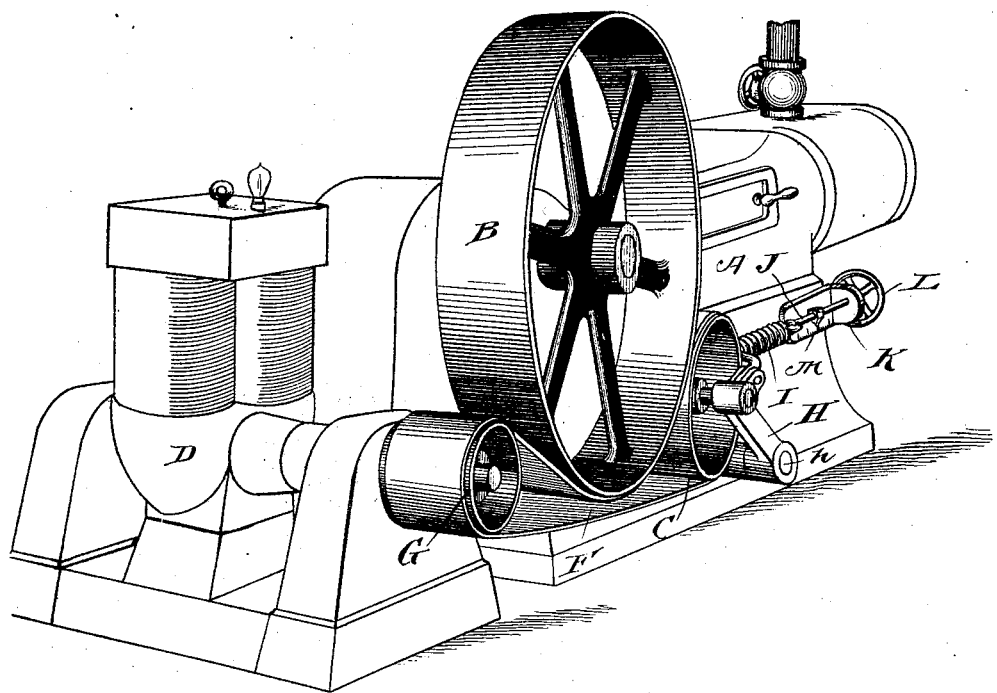
Figure 2:
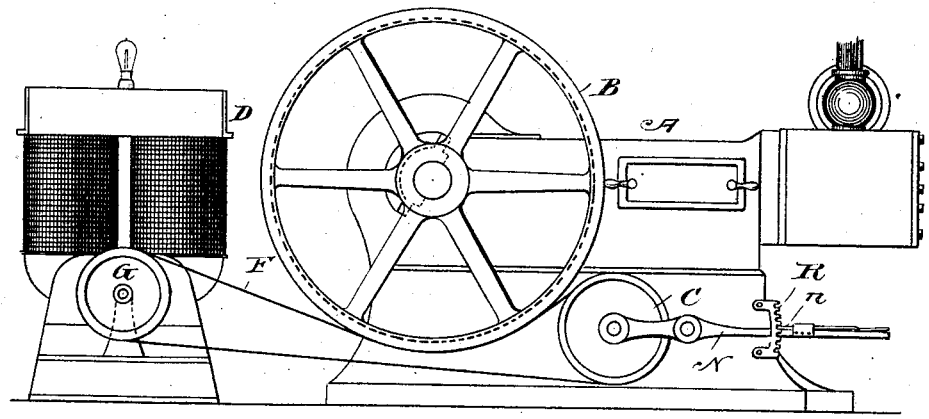
Figure 3:
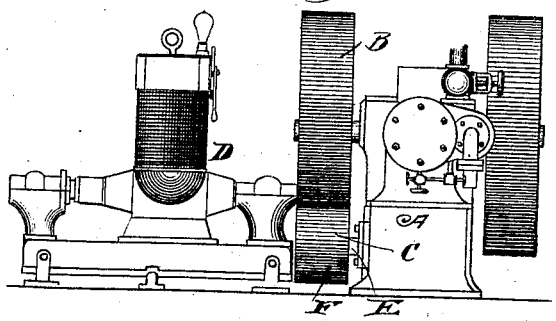
Figure 4:
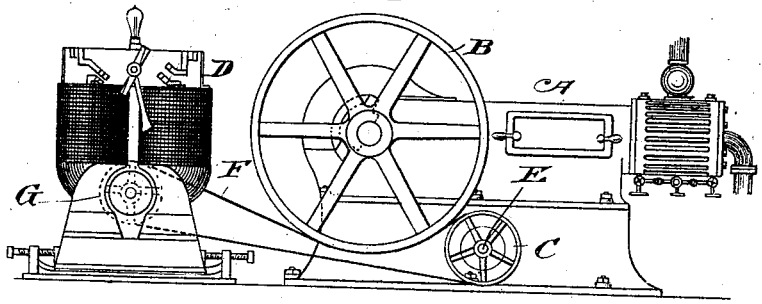
Figure 5:
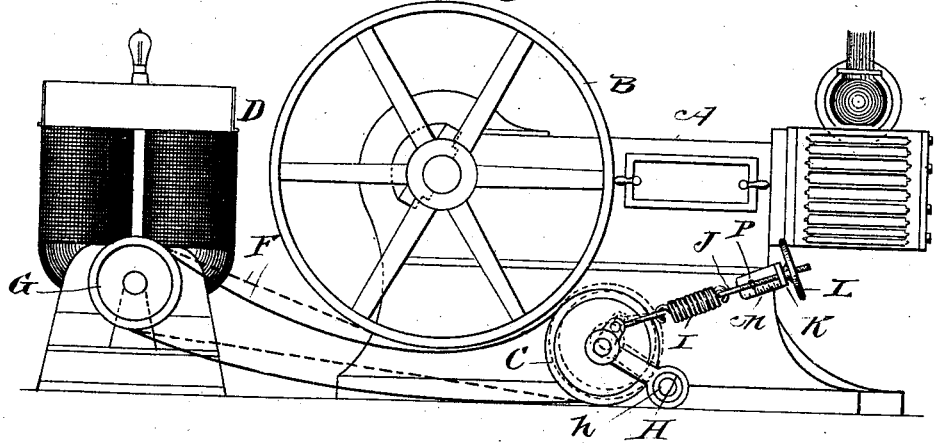

In the accompanying drawings, Figure 1 is a perspective view showing my invention in the preferred form and as applied to the driving of a dynamo. Fig. 2 is a side elevation showing a modified form. Figs. 3 and 4 are end and side elevations respectively, showing the idler pulley mounted upon a stud secured upon the engine base and the dynamo being movable. Fig. 5 is a side elevation showing the idler pulley mounted in a spring controlled frame. Figs. 6 and 7 are, respectively, a side elevation and a plan showing the swinging spring controlled frame for the idler pulley and two dynamos arranged in proximity to and driven by the same engine.

In the drawings, A represents the engine and B the driving pulley thereof.

In the construction shown in Figs. 1 to 7 inclusive the engine is shown adapted to run a dynamo D, and in Figs. 6 and 7 two dynamos driven by the same engine are shown.

For the sake of economizing space and for other reasons it is desirable to arrange the dynamo close to the engine and to drive it by as short a belt as can be employed. I accomplish this result in a simple, reliable and efficient manner by mounting an idler pulley C upon the engine base in close proximity to the driving pulley of the engine. This idler is located in such position that its upper surface is higher than the lower surface of the driving pulley B, and the idler, as shown in Figs. 3 and 4, is mounted upon a rigid stud or pin E secured directly to the engine base. A belt F is passed around the idler and its upper strand is in contact with the surface of the driver B and the belt is also carried around the driven pulley G of the dynamo. The axis of the driven pulley G may be higher than that of the idler C while the top surface of the driven pulley is higher than the lower surface of the driver, thus securing a belt contact upon the driven pulley over more than one-half of its periphery and securing also a length of contact of the belt with the rim of the driver which will render the driver efficient to turn the belt by frictional contact therewith.

As shown in Figs. 3 and 4, the dynamo is adapted to be shifted to tighten or loosen the belt, but I prefer, for obvious reasons, to mount the idler upon a frame which can be adjusted so as to bring the belt into or throw it out of contact with the driver. This may be done in various ways, the arrangement shown in Figs. 5, 6, and 7 comprising a swinging frame or yoke H pivoted on a stud $h$ projecting from the engine base. The idler is journaled in this yoke and a spring I has one end secured to the yoke, its opposite end being attached to an eye-bolt J, the threaded end of which passes through a bracket K and has a hand wheel L for controlling the frame and for adjusting the tension of the spring. The bolt J may carry the pointer P which will indicate by its movement over the scale plate M the tension of the spring, which may be regulated so as to yield to the desired extent to the pull on the belt, thus permitting requisite elasticity of tension.

In Fig. 2 a further modification of the same idea is shown. In this case the yoke has a lever N rigidly secured therewith and this lever carries a pawl *n* which engages the teeth of a ratchet R. The lever N may be made of spring metal so that a certain amount of elasticity is permitted which will allow the vibration of the idler giving the requisite elasticity to the belt. The swinging frame is adjusted in the one case by the manipulation of the hand wheel and by the release of the pawl and the swinging of the lever in the construction shown in Fig. 2. The former construction is preferred, although the latter permits the driving belt to be thrown into and out of contact quickly.

The adaptation of my invention to the driving of two dynamos or other machines from a single engine is shown in Figs. 6 and 7, the construction of parts and the principle of operation being the same as shown in previous figures. By this arrangement either of the dynamos or other machines driven by the engine may be stopped or started at will while the engine is running and without interfering with the other machine.

The advantage of mounting the idler directly upon the engine base will be apparent. When so mounted the idler may be shipped as a part of the engine and it may be adjusted with reference to the driving pulley by the engine builder. Where the machine which is driven is of such construction that the belt may be shifted by moving the machine or by the operation of a belt shifter connected therewith, it is not essential that the idler should be mounted upon a swinging frame; but the latter construction is preferred in all cases not only because the throwing of the belt into and out of gear may be easily and speedily effected, but also because when so mounted the swinging frame may be controlled by a compensating spring or weight gaged to secure the requisite tension on the belt. In all cases economy of space, belting and power is secured.

It will be obvious from the description and drawings that the principle of my invention may be embodied in various forms of construction and arrangement of parts, and therefore it will be understood that I do not limit my invention to mere details of construction.

I claim—

1. In means for transmitting power, the combination with an engine and its driving pulley, of an idler pulley mounted upon the base of the engine, with its rim arranged in a plane intersecting the plane of the rim of the driving pulley and a belt carried over the idler and adapted to be driven by the frictional contact of the driver with a strand thereof, substantially as described.

2. The combination, with an engine and its driving pulley, of a frame pivotally mounted upon the engine base, and an idler pulley carried by said frame, substantially as described.

3. The combination with an engine and its driving pulley, of a swinging frame mounted upon the engine base and an idler pulley mounted in said frame, and adapted to be moved into such position that the plane of the rim of the idler pulley will intersect the plane of the rim of the driving pulley the frame being yieldingly sustained against the pull of the belt, substantially as described.

4. The combination with an engine and its driving pulley, of an idler pulley mounted upon the base of the engine, a driven pulley and a belt passing over the driven pulley and the idler and with one strand thereof in contact with the rim of the driver, the said several pulleys being so arranged that the plane of the driving pulley intersects the planes of the driven pulley and the idler whereby to secure suitable contact of the driving pulley upon the belt, substantially as described.

ALBERT L. IDE.

Witnesses:
C. C. LINTHICUM,
N. M. BOND.